Figure 1:
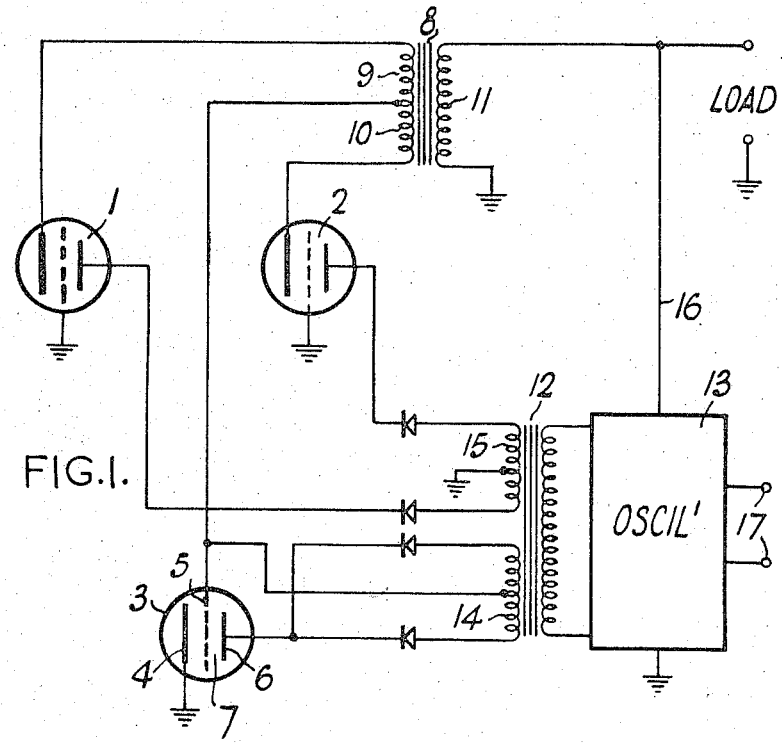

INVENTORS
D. GABOR
H. W. KRETSCH

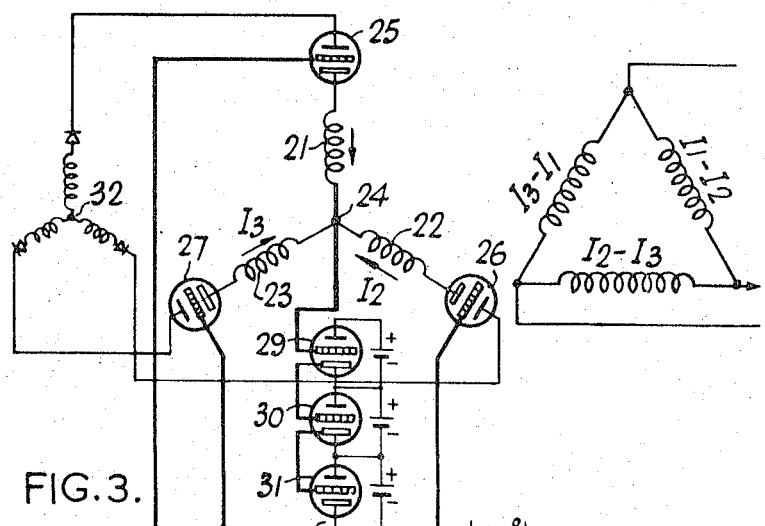

United States Patent Office 3,365,653
Patented Jan. 23, 1968

3,365,653
ELECTRIC CURRENT GENERATION BY MEANS OF THERMIONIC ENERGY CONVERTERS
Dennis Gabor, London, England, and Hans Walter Kretsch, Newton, Conn., assignors to National Research Development Corporation, London, England, a corporation of Great Britain
Filed Oct. 30, 1964, Ser. No. 407,688
Claims priority, application Great Britain, Nov. 4, 1963, 43,501/63
6 Claims. (Cl. 322—2)

This invention relates to the direct generation of electric current from heat by means of thermionic energy converters. More particularly it is concerned with arrangements designed to generate alternating current.

In particular types of thermionic energy converter the ions are supplied by an auxiliary discharge from an auxiliary electrode arrangement the potential applied to which controls the main discharge. Such types of converter can be termed thermionic energy converters of the triode type.

The present invention comprises an arrangement for generating alternating current in which the output current from one or more thermionic energy converters is switchable to flow along two or more alternative paths in cyclic sequence by means of control signals applied to the auxiliary electrodes of thermionic converters of the triode-type included in said paths, which paths each also include transformer windings enabling an alternating output voltage to be derived by an output winding coupled to said windings.

It will be understood that while the triode-type thermionic converters in the two or more alternative paths do not operate continuously so that their efficiency is reduced by the fact that they will continuously consume heat without continuously generating electric power, this is not the case with the one or more thermionic energy converters the output current from which is switchable. Preferably a number of such thermionic energy converters are connected in series and these converters will be utilised continuously and will carry a constant, or almost constant, current. The overall efficiency increases therefore with the number of these thermionic generators which are connected in series. Their number is only limited by the switching capacity of the controlling triode-type thermionic energy converters, since if the number of converters in series is beyond a certain limit the triode converters will lose their power of control and will start arcing spontaneously.

A suitable energy converter of the triode-type for use in the present invention is the converter disclosed in U.S. application Ser. No. 415,238, filed Dec. 2, 1964, now patent No. 3,312,840. The converter device disclosed therein comprises a heated emitter electrode and foraminated collector electrode positioned in close spaced apart relationship to the emitter and an auxiliary anode provided in an auxiliary discharge space behind the collector electrode in which ions are generated by means of an auxiliary discharge between the emitter electrode and the auxiliary anode. The characteristics of such device are such that the auxiliary discharge current controls the main discharge current in the sense that when the auxiliary current is zero the main current is also zero while when auxiliary current flows main current flows which can be 50 to 100 times greater than the auxiliary current. However the invention is in no way limited to a triode-type converter of the kind described in the above mentioned patent application and other triode-type converters, in which an auxiliary electrode arrangement is provided which may not be in a separate auxiliary discharge space, can equally well be used.

The one or more thermionic energy converters referred to above can themselves be thermionic energy converters of the triode-type or else they can be any other suitable kind of thermionic energy converter for instance caesium diodes and they may in embodiments of the invention be serially connected.

In order to ensure that the final output voltage has an appropriate waveform the auxiliary electrodes are preferably energised by part-sinusoidal control signals in spaced apart phase relationship to each other which signals are derived from the output voltage or from an oscillator which controls the frequency.

The arrangement can be adapted to generate single phase A.C. by providing two alternative paths for current each including a respective thermionic energy converter of the triode-type which has its auxiliary electrode supplied by half-wave sinusoidal signals in alternate half cycles. Alternatively, the arrangement can be adapted to provide a polyphase output in which $n$ paths are provided for the output current each containing a thermionic energy converter of the triode-type and the transformer windings in the respective paths are connected together in star formation. Control signals applied to the auxiliary electrodes of the triode-type energy converters are spaced apart by $2\pi/n$ radians of the output. If a pure sinusoidal output current is desired each control of signal should comprise the envelope of two half-sinusoidal pulses of the output voltage waveform spaced apart by $\pi/n$ radians. In such a case it will be appreciated that the current through the thermionic energy converter is not constant. If it is desired to ensure that this current is constant, so as to maximise the output power, then the waveforms of the control signals to the auxiliary electrodes of the triode-type thermionic energy converters need to be square waves. In this case the final output will no longer be a pure sinusoidal waveform, but can be converted on to such a shape by means well known in the art. In practical arrangements the waveforms of the control signals can be shaped to provide a compromise between a pure sinusoidal output and constant current from the converters.

Figure 2:
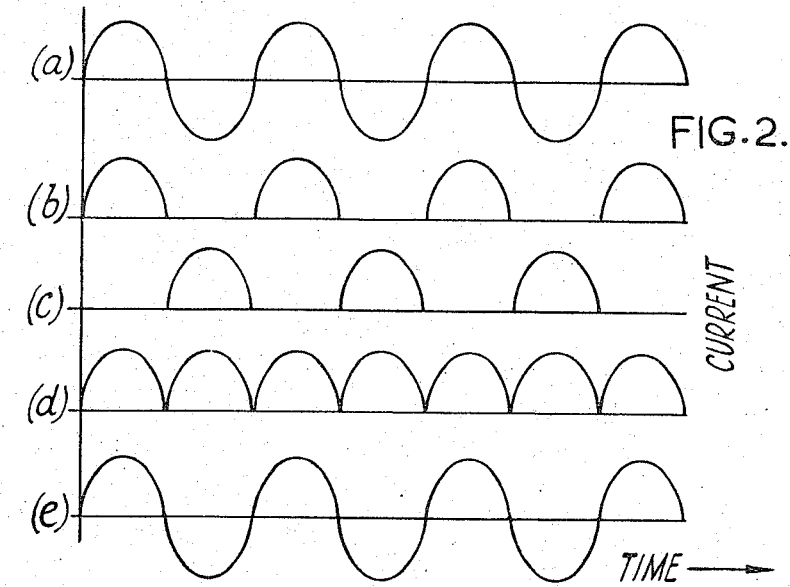

In order that the invention may be fully understood reference will now be made to the drawings accompanying this specification in which:

FIGURE 1 is a circuit of a single phase generation arrangement embodying the invention, FIGURE 2 illustrates waveforms explanatory of the operation of the circuit of FIGURE 1, FIGURE 3 is a circuit of a three phase generation arrangement embodying the invention, and FIGURE 4 and FIGURE 5 illustrate waveforms relevant to alternative methods of operating the FIGURE 3 circuit.

Referring now to FIGURE 1 there is shown therein three thermionic energy converters 1, 2 and 3 of the triode-type which are disclosed in Patent No. 3,312,840 although it will be understood that other triode-type converters can also be used. Each of these converters comprises an emitter electrode 4 (arranged to be heated by a source not shown), a foraminated collector electrode 5 positioned in close spaced apart relationship to emitter 4 and an auxiliary anode 6 positioned behind collector 5 and defining an auxiliary discharge space 7 between collector 5 and anode 6. When the emitter 4 of the device is heated thermionic current can flow between emitter 4 and collector 5 under the control of an auxiliary discharge produced by applying an appropriate potential to auxiliary anode 6. In the circuit shown in FIGURE 1 the emitter of converter 3 is earthed and the collector of emitter 3 is connected to the centre tap of a primary winding of a transformer 8 having a secondary winding 11 connected to a load circuit. The primary winding has its two halves 9 and 10 respectively connected to the emitter of converter 1 and to the emitter of converter 2. The collectors of both converters 1 and 2 are earthed. It will thus be seen that a complete circuit is provided through converter 3 for the output current thereof which can be switched through either winding 9 or winding 10 depending on whether triode 1 or 2 is conducting.

The auxiliary anodes of converters 1 and 2 are connected through individual rectifiers to opposite ends of a centre tapped secondary winding 15 of a control transformer 12 the primary winding of which is energised from an oscillator 13. This oscillator is arranged to be driven in synchronism with the output voltage derived from the power output winding 11 of transformer 8 by means of a connection 16 from winding 11 to oscillator 13. In addition, transformer 12 has a further secondary winding 14 connected to supply full wave rectified pulses to the auxiliary anode of converter 3.

To start the circuit it is necessary to apply a momentary D.C. pulse to oscillator 13 along lines 17, but thereafter the circuit is self-maintaining due to the feed back connection 16. However if the arrangement is used for supplying power to an alternating current system oscillator 13 will not be required since the controlling signals can then be derived from the mains.

The operation of the circuit illustrated in FIGURE 1 will now be described with the assistance of the waveforms in FIGURE 2, all of which show currents in various parts of the circuit plotted against the same time axis. Waveform $a$ is the output from oscillator 13 and is a pure sinusoidal waveform. This waveform produces half-wave sinusoidal signals in alternate half cycles in the two halves of secondary winding 15 of transformer 12 and these, when applied to the converters 1 and 2 respectively produce output currents of similar waveform, and these are shown at $b$ and $c$ respectively. The waveform supplied to the auxiliary anode, and thus the output current, of converter 3 is shown at $d$ in FIGURE 2 and comprises a full wave rectified signal.

The two triode-type converters 1 and 2 alternately permit conduction through the two half-windings 9 and 10 of transformer 8 and converter 3 is in series with either converter 1 or converter 2 during successive half-cycles of the output voltage so that the output of converter 3 is added to the output of converter 1 or 2. The final output voltage across winding 11 is thus a pure sine wave as shown at $e$. From the foregoing it will be seen that the arrangement is more efficient than one in which any other type of switch is used in place of the triode-type converters 1 and 2 to switch the output of converter 3 since in the arrangement disclosed herein not only is there no loss of voltage across the switching converters 1 and 2 but in fact these switches have a forward E.M.F. It is also pointed out that while converters 1 and 2 operate during alternate half cycles converter 3 operates in every half cycle and is therefore more efficient than the converters 1 and 2.

While only one converter 3 is illustrated as being connected in the manner shown it will be appreciated that the single converter 3 can be replaced by a plurality of converters connected in series if a larger output is required. Furthermore these converters do not necessarily need to be converters of the triode-type but any other type of converter can equally well be used in place of converter 3.

The arrangement illustrated in FIGURE 3 is for the generation of three phase alternating current. The circuit includes a three phase transformer having a star connected primary winding, the three constituent windings 21, 22 and 23 of which are connected together at the star point 24. Windings 21, 22 and 23 are respectively connected to the emitter electrodes of triode-type thermionic converters 25, 26 and 27 the collector electrodes of which are connected together at a common point 28. Between star point 24 and the above-mentioned common point 28 there is provided three triode-type thermionic converters 29, 30 and 31, having their emitter electrodes and collector electrodes connected in series with the emitter of converter 31 connected to the common point 28 and the collector electrode of converter 29 connected to the star point 24. The auxiliary electrodes of the triode-type converters 25, 26 and 27 are connected through individual rectifiers to a star connected control winding 32 the arms of which are magnetically coupled to the primary winding.

In operation of the circuit the three series connected converters 29, 30 and 31 operate continuously and their output current is passed in cyclic sequence through each winding 21, 22 and 23 in turn under the control of the triode-type converters 25, 26 and 27, which thus act in a manner analogous to valves. The respective currents through the windings 21, 22 and 23 are designated $I_1$, $I_2$ and $I_3$ respectively and all flow towards the star point 24. The output from the circuit is obtained from a delta connected secondary winding 33 the currents in each winding of which will be $I_1-I_2$, $I_2-I_3$ and $I_3-I_1$ respectively. It will be understood that although a delta connected output winding is shown other arrangements of obtaining an output from the circuit can equally well be used.

An important feature of the three phase circuit illustrated in FIGURE 3 is that the series connected converters 29, 30 and 31 operate continuously and in fact can be arranged to provide constant current. The auxiliary electrodes of these converters can be energised by any convenient D.C. source illustrated conventionally by batteries, to ensure that the proper auxiliary discharge is maintained. It is also pointed out that these series connected converters can be replaced by any suitable type of thermionic energy converter whether of the triode-type or diodes.

To obtain a pure sinusoidal output current from the circuit the control electrodes of the triode-type converters 25, 26 and 27 which act as valves need to be supplied by control signals having the waveforms illustrated at $a$, $b$ and $c$ respectively in FIGURE 4. These waveforms are the same for both the control signals and for the output currents $I_1$, $I_2$ and $I_3$. Each control pulse consists of two sinusoidal branches shifted by 60° electrical relative to each other with each pulse extending over a total of 240° electrical. The commencement of the control pulses to each valve are spaced apart by 120° electrical. As shown at $d$ in FIGURE 4 these current pulses in the primary winding of the transformer produce pure sinusoidal output current pulses in the delta connected secondary of which $I_1-I_2$ is illustrated as an example. Considering now the currents through the series connected converters, these will be the sum of the three currents through the primary windings 21, 22 and 23 and the resultant waveform $I_1+I_2+I_3$ is shown at $e$. This total current while being continuous is not constant but has a third order harmonic with an amplitude a little less than half of the direct current component.

It is possible to operate the circuit of FIGURE 3 so that the currents through the series connected converters 29, 30 and 31 is constant and the waveforms in such a mode of operation are illustrated in FIGURE 5. The waveforms of the control signals applied to the auxiliary anodes of converters 25, 26 and 27, and hence the waveforms of the currents $I_1$, $I_2$ and $I_3$ are illustrated at $a$, $b$ and $c$ respectively. These pulses have the shape of squared sine waves extending over two-thirds of a cycle. The resultant output waveforms such as $I_1-I_2$ are shown at $d$ while the sum of all the currents $I_1+I_2+I_3$ will be constant as shown at $e$. In addition there are several other pulse shapes, for instance trapezoidal waves, which produce a constant current in the series arm. In practice it may be best to strike a compromise between the requirements of constant D.C. and pure sinusoidal output.

While the above described arrangement illustrates a three phase circuit it will be understood that the same circuit can be extended to any number of phases in which case the compromise between constant D.C. and a pure sine wave becomes increasingly better with increasing number of phases.

We claim:

1. An arrangement for generating alternating current comprising at least one thermionic energy converter, at least two alternative output paths for the output current from said at least one thermionic energy converter, at least one thermionic energy converter of the triode-type and a transformer primary winding connected in series therewith in each of said paths, switching means for applying control signals to the auxiliary electrodes of the triode-type thermionic energy converters in said paths in time sequence to switch the output current from said at least one thermionic energy converter sequentially through each of said transformer windings in turn and alternating current output means coupled to said transformer windings.

2. An arrangement for generating alternating current comprising at least one thermionic energy converter, at least two alternative output paths for the output current from said at least one thermionic energy converter, a thermionic energy converter of the triode-type and a transformer primary winding connected in series in each of said paths, alternating current output means coupled to said transformer windings, and switching means for applying time spaced control signals derived from said alternating current output means to the auxiliary electrodes of said triode-type thermionic energy converters in each path to switch the output current from said at least one thermionic energy converter into each of said paths in sequence.

3. An arrangement for generating single phase alternating current comprising at least one thermionic energy converter, two alternative output paths for the output current from said at least one thermionic energy converter, each of said paths including at least one thermionic energy converter of the triode-type and a transformer primary winding in series therewith, alternating current output means coupled to said transformer windings, and switching means for applying half-wave sinusoidal control signals alternately to the auxiliary electrodes of said triode-type thermionic energy converters in successive half cycles of the output, said control signals being derived from said output means.

4. An arrangement for generating polyphase alternating current comprising at least one thermionic energy converter, $n$ alternative output paths for the output current from said at least one thermionic energy converter (where $n$, is a positive integer), all of said paths including at least one thermionic energy converter of the triode-type and a transformer primary winding in series therewith, the transformer primary windings in said paths being connected together in star formation, alternating current output means coupled to said star-connected transformer windings, and switching means for applying control signals to the auxiliary electrodes of the triode-type thermionic energy converters in each of said paths in time sequence, the control signals supplied to successive paths being spaced apart by $2\pi/n$ radians of the output.

5. The arrangement as claimed in claim 4 in which said control signals each comprise the envelope of two half-sinusoidal pulses spaced apart by $\pi/n$ radians.

6. The arrangement as claimed in claim 4 in which said control signals each comprise somewhat squared part-sinusoidal waveforms shaped so that constant current is drawn through said at least one thermionic energy converter.

References Cited

UNITED STATES PATENTS

| | | | |
|---|---|---|---|
| 3,119,059 | 1/1964 | Hall et al. | 322—2 |
| 3,273,048 | 9/1966 | Hoff et al. | 310—4 X |
| 3,329,885 | 7/1967 | Gabor et al. | 322—2 |

JOHN F. COUCH, *Primary Examiner.*

G. GOLDBERG, *Assistant Examiner.*